US012676263B2

(12) United States Patent
Singh et al.

(10) Patent No.: US 12,676,263 B2
(45) Date of Patent: ***Jul. 7, 2026

(54) ENHANCING THE QUALITY FACTOR OF PLANAR CAPACITORS WITHOUT IMPACTING THE RESONANCE FREQUENCY

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/669,888

(22) Filed: May 21, 2024

(65) Prior Publication Data

US 2025/0364183 A1 Nov. 27, 2025

(51) Int. Cl.
*H01G 4/30* (2006.01)
*H01G 4/228* (2006.01)
*H01G 4/40* (2006.01)

(52) U.S. Cl.
CPC .............. *H01G 4/228* (2013.01); *H01G 4/30* (2013.01); *H01G 4/40* (2013.01)

(58) Field of Classification Search
None
See application file for complete search history.

(56) References Cited

U.S. PATENT DOCUMENTS 5,925,921 A 7/1999 Susak
6,410,954 B1 * 6/2002 Sowlati ................ H10D 84/212
257/E21.018
(Continued)

FOREIGN PATENT DOCUMENTS

WO 2006/039699 4/2006

OTHER PUBLICATIONS

Singh, et al., "Thermally Actuated SOI RF MEMSBased Fully Integrated Passive Reflection-Type Analog Phase Shifter for mmWave Applications," IEEE Transactions on Microwave Theory and Techniques, (2020)1-1. doi: 10.1109/tmtt.2020.3018141.
(Continued)

*Primary Examiner* — Timothy J. Dole
*Assistant Examiner* — Esther N Lian
(74) *Attorney, Agent, or Firm* — Amin, Turocy & Watson, LLP

(57) ABSTRACT

The technology described herein is directed towards a planar-type capacitor with a modified design (relative to standard capacitors), in which an array of interconnects facilitates electrical surface current flow between the first conductor and the second conductor, determines the self-resonant frequency of the capacitor, and provides an improved quality factor to an extent. The array (or enlarged area) of conducting interconnects results in capacitors with larger self-resonant frequency, e.g., having a substantially stable capacitance over a range of high radio frequencies, including millimeter wave frequencies. The designs described herein further decouple the capacitor's quality factor from the self-resonant frequency, based on a design modification to the shape of the RF signal port that changes the capacitor's parasitic inductance, facilitating greater flexibility in radio frequency component tuning. The modified capacitor provides benefits in various circuits, e.g., in an
(Continued)

impedance or a millimeter wave frequency phase shifter for antenna elements.

20 Claims, 10 Drawing Sheets

(56) References Cited

U.S. PATENT DOCUMENTS

| | | | | |
|---|---|---|---|---|
| 9,875,848 | B2 * | 1/2018 | Berdy | H10D 1/66 |
| 2004/0080023 | A1 | 4/2004 | Ueda | |
| 2007/0278551 | A1 * | 12/2007 | Anthony | H01L 23/5225 |
| | | | | 257/307 |
| 2014/0103489 | A1 | 4/2014 | Dirnecker et al. | |
| 2015/0179731 | A1 | 6/2015 | Lasiter et al. | |
| 2015/0295020 | A1 | 10/2015 | Tseng et al. | |
| 2015/0318107 | A1 * | 11/2015 | Hecht | H01F 27/40 |
| | | | | 361/270 |
| 2020/0211955 | A1 | 7/2020 | Rubin et al. | |
| 2021/0265116 | A1 | 8/2021 | Aburakawa et al. | |
| 2023/0187479 | A1 | 6/2023 | Tu et al. | |
| 2023/0307185 | A1 * | 9/2023 | Voiron | H10D 1/043 |
| 2023/0352396 | A1 * | 11/2023 | Hsiao | H01G 4/385 |
| 2025/0174399 | A1 | 5/2025 | Singh et al. | |

OTHER PUBLICATIONS

International Search Report and Written Opinion mailed Sep. 2, 2024 for PCT Application No. PCT/US2024/013895, 16 pages.

Wen Jia-Ming et al: "Fabrication and Characteristics of Aluminum Oxide MIM Capacitors with Interconnections using BCB-based MEMS Technology", 2020 International Conference On Microwave and.Millimeter Wave Technology {ICMMT), IEEE, Sep. 20, 2020, 3 pages.

Motlagh Bm et al: " High-Q fringing-field-enhanced capacitors {FFE) for deep submicron Silicon-MMICs" Microwave Conference, 2004. 34th European Amsterdam, the Netherlands, Piscataway, NJ, USA,IEEE, Oct. 14, 2004, 4 pages.

Irwin, et al., "Basic Engineering Circuit Analysis", New York: John Wiley & Sons, Inc., 2002, pp. 1-432.

Irwin, et al., "Basic Engineering Circuit Analysis", New York: John Wiley & Sons, Inc., 2002, pp. 433-831.

Robbins, et al., Circuit Analysis: Theory and Practice, 5th ed., Cengage Learning, 2012, pp. 554-558.

Hughes, et al., "Hughes Electrical and Electronic Technology," 11th ed., Pearson, 2012, pp. 237-241.

Glisson, "Introduction to Circuit Analysis and Design," Springer, 2011, pp. 1-388.

Glisson, "Introduction to Circuit Analysis and Design," Springer, 2011, pp. 389-768.

Singh, et al., "Monolithically Integrated Reconfigurable Rf Mems Based Impedance Tuner on SOI Substrate," in 2019 IEEE MTT-S International Microwave Symposium (IMS), doi:10.1109/mwsym.2019.8701106.

Office Action mailed Jul. 8, 2025 for U.S. Appl. No. 18/519,346, 42 pages.

Notice of Allowance mailed Oct. 31, 2025 for U.S. Appl. No. 18/519,346, 24 pages.

* cited by examiner

*Design Modifications*

420

432

420

100 μm

100 μm

432

ENHANCING THE QUALITY FACTOR OF PLANAR CAPACITORS WITHOUT IMPACTING THE RESONANCE FREQUENCY

BACKGROUND

Capacitors are fundamental circuit elements in many electronics and electrical applications, including automotive, consumer electronics, biomedical, defense, satellites, and wireless communications. In high-frequency wireless communications, including fifth generation (5G), sixth generation (6G) and beyond, features such as massive machine-type communications (mMTC) and ultra-reliable low-latency communication (URLLC) are highly desirable. Examples of machine-to-machine (M2M) use cases can include time-sensitive industrial IoT (IIoT) applications, autonomous vehicles, sophisticated drone systems, and asset tracking systems. These applications could use improved passive components, notably capacitors and inductors.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
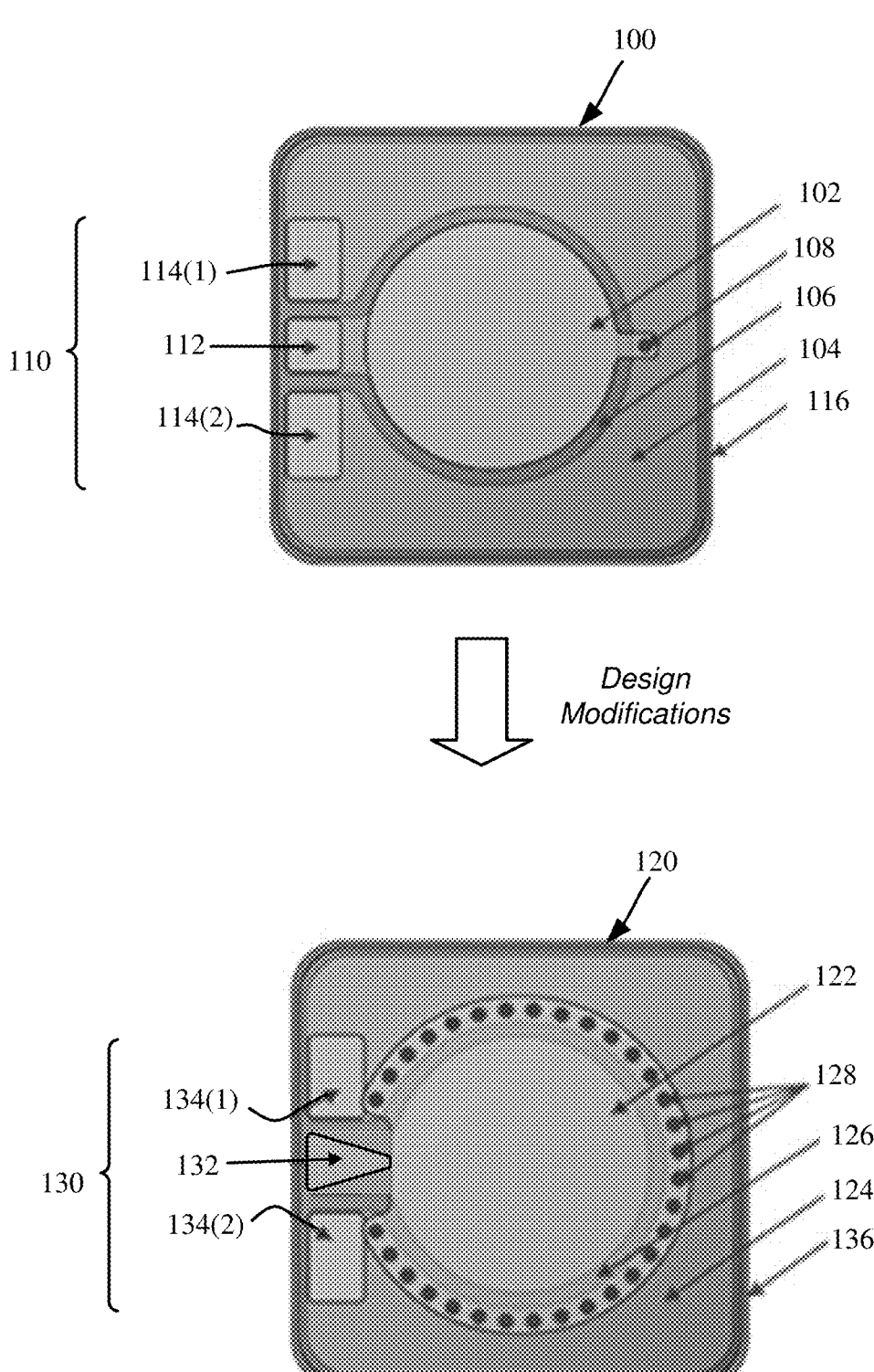
FIG. 1 comprises top view representations of example capacitors, including a modified capacitor having a distributed array of conducting interconnects along the device periphery (in contrast to a conventional capacitor) and a tapered radio frequency (RF) port section, in accordance with various embodiments and implementations of the subject disclosure.

As alluded to in the background, various electrical applications could use improved passive components, such as capacitors and inductors. Presently, commercial high-frequency capacitors serve sectors from 1 gigahertz (GHz) to 4 GHz, encompassing cellular bases, mobile phones, and 4G infrastructures. High-frequency capacitors are limited by their resonant frequencies, making them less effective beyond their self-resonant frequencies, generally because a capacitor's capacitance value increases exponentially while approaching its first self-resonant frequency, (and behaves like an inductive element above the capacitor's self-resonant frequency). Another significant design consideration in 5G and millimeter-wave systems is the quality factor (Q-factor) of a capacitor, which in general represents the efficiency of the capacitor in terms of energy loss; that is, the Q-factor of a capacitor is a measure of how lossless the capacitor is. In general, increasing the self-resonant frequency results in a concomitant rise in the Q-Factor, and vice versa. The Q-factor is inversely proportional to the frequency and thus gets worse at higher frequencies, which, like the self-resonant frequency, limits a traditional capacitor's operational frequency.

Various embodiments of the technology described herein are generally directed towards planar, metal-insulator-metal (MIM) capacitors that can independently improve the self-resonant frequency and quality factor (Q-factor) of a capacitor device while keeping the capacitance value constant, including at ultra-high-frequencies. In general, MIM capacitors can provide high capacitance in compact footprints, and can be seamlessly integrated onto printed circuits or on-chip using dual metal layers.

The technology described herein facilitates capacitor designs that significantly improve the Q-factor of planar capacitors without influencing their self-resonance frequency (SRF). This is particularly valuable, and is based on only layout-level adjustments, with no need for changes in manufacturing processes or the incorporation of unconventional materials. A significant part of the technology described herein results from the decoupling of Q-factor and SRF enhancement, allowing for greater flexibility in radio frequency (RF) component tuning.

To achieve such decoupling, planar capacitors constructed using overlapping conductors separated by a dielectric medium are modified (relative to traditional capacitors) by extending the top conductor electrode to encompass the RF ground plane, and by distributing vias between the top (M2) and bottom (M1) conductor layers around the RF ground plane's perimeter. This can be applied to MIM capacitors of any shape, and further can be scaled to multilayer configurations. Another design modification involves the shape of the RF port, which changes the parasitic inductance based on the shape.

The technology described herein offers industries a straightforward path to produce miniaturized, high-performance MIM capacitors without complex alterations to their existing fabrication methodologies. The design not only optimizes the Q-factor of planar capacitors while maintaining their capacitance value, but does so with minimal influence on the resonant frequency.

It should be understood that any of the examples herein are non-limiting. Thus, any of the embodiments, aspects, concepts, implementations, structures, functionalities or examples described herein are non-limiting, and the technology may be used in various ways that provide benefits and advantages in capacitors in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

In general, capacitors are electronic circuit elements that store an electrical charge. Capacitors are basically conductive metal plates separated by an insulator (dielectric). The capacitance, or amount of charge held by the capacitor per applied voltage, depends on parameters including the area of the plates, the distance between the plates, and the dielectric constant value of the insulator layer between the plates. Capacitors are used in a variety of devices such as filters, analog-to-digital converters, memory devices, control applications, high frequency electronics and many other types of electronic circuits. Radio frequency (RF) circuits have associated capacitive elements, as at high frequencies capacitive and inductive effects become more prominent relative to direct current or low frequencies.

One type of capacitor is a metal-insulator-metal (MIM) capacitor, which is frequently used with circuits needing high capacitance in a small area. MIM capacitors are developed using two layers of a printed circuit board (PCB) or similar material stack, utilizing the dielectric layer between as the dielectric insulator.

In electrical circuits, reactance is the opposition presented to alternating current by inductance or capacitance; reactance is similar to resistance but differs in that reactance does not lead to dissipation of electrical energy as heat, but instead stores energy which is returned to the circuit a quarter cycle later. As frequency increases, inductive reactance increases and capacitive reactance decreases.

With high frequency circuits such as for 5G, millimeter wave (mmWave) or sub-terahertz (sub-THz, between 90 and 300 gigahertz, typically beyond 100 gigahertz) frequencies, the capacitive reactance and its relationship with the increasing frequency are significant considerations. Capacitive reactance, Xc, in ohms (Ω) is given by:

$$Xc = -\frac{1}{\omega C} = -\frac{1}{2\pi f C}$$

where, f is the frequency in hertz (Hz), and C is the capacitance in farads (F). The impedance of a capacitor is given by $C = -jX_c$.

At f=0, the magnitude of the capacitor's reactance is infinite, behaving like an open circuit and thus preventing any current from flowing through the dielectric. As frequency increases, the magnitude of reactance decreases, allowing more current to flow. As f approaches infinity, the capacitor's reactance approaches 0, behaving like a short circuit.

Inductive reactance is a property exhibited by an inductor, in which an electric current produces a magnetic field around an inductor. In the context of an alternative current circuit, the magnetic field is constantly changing because of the oscillating current. The change in the magnetic field induces another electric current to flow in the same wire, in a direction such as to oppose the flow of current originally responsible for producing the magnetic field. Hence, inductive reactance is an opposition to the change of current through an element.

Inductive reactance $X_L$ is proportional to the sinusoidal signal frequency f and the inductance L, which depends on the physical shape of the inductor and is given by:

$$X_L = \omega L = 2\pi f L$$

The quality factor, or simply the Q-factor or Q is a parameter that describes the resonance behavior of an underdamped harmonic oscillator or resonator. Sinusoidally driven resonators having higher Q-factors resonate with greater amplitudes at resonant frequency, but have a smaller range of frequencies around that frequency at which they resonate; the range of frequencies for which the oscillator resonates is called the bandwidth. Thus, a high-Q tuned circuit in a radio receiver is more difficult to tune but has more selectivity, whereby it does a better job of filtering out signals from other stations that lie nearby on the spectrum. High-Q oscillators oscillate with a smaller range of frequencies and are more stable.

In real circuits, resistance cannot be avoided. All conductors at room temperature such as aluminum, copper, gold, platinum, tungsten, etc., have finite conductivity except superconductors, which have near zero resistance at cryogenic temperatures (near zero still means minimal resistance but not completely zero). A capacitor or inductive element when implemented in a circuit has small effective resistance R associated within. The Q-factor of a capacitor at the operating frequency f is defined as the ratio of the reactance of the capacitor to its series resistance.

The Q-factor of a capacitor represents the efficiency of a given capacitor in terms of energy losses or in short, the Q of a capacitor is a measure of how lossless a capacitor is and is given by:

$$Q = \frac{X_C}{R_C} = \frac{1}{2\pi f C R_C}$$

where, f is frequency (Hz), C is capacitance in farads, $X_C$ is reactance of the capacitor in ohms, and $R_C$ is the equivalent series resistance (ESR) of the capacitor in ohms. With increasing frequency, the Q-factor decreases (gets worse). For example, in an ideal scenario, a 1 picofarad (pF) capacitor with 0.1 ohms resistance would have a Q value of 159 at 10 GHz; however, in practice, the design of a capacitor, processing technology, material purity, contamination and so forth can deteriorate the Q-factor significantly.

In an alternating current system, the Q-factor represents the ratio of energy stored in the capacitor to the energy dissipated as thermal losses in the equivalent series resistance. For example, a capacitor that can store 2,000 joules of energy while wasting only 1 joule has a Q-factor of 2,000. Because Q is the measure of efficiency, an ideal capacitor would have an infinite value of Q meaning that no energy is lost at all in the process of storing energy. This is derived from the fact that the equivalent series resistance of an ideal capacitor equals zero.

The Q-factor is not a constant value, but rather changes significantly with frequency. One reason is the clear $2\pi f$ term in the above equation; another is that equivalent series resistance is not a constant value with respect to frequency. The equivalent series resistance varies with frequency due to the well-known skin effect, in which current tends to flow around the outer edge of a conductor, as well as other effects related to the dielectric characteristics.

Lower frequency applications do not have to take the Q-factor into consideration, and standard capacitors may be used in those applications. However, the Q-factor is a significant capacitor characteristic in the design of RF circuits. At RF frequencies, the equivalent series resistance increases with frequency due to the skin effect. Along with the increase in equivalent series resistance, dissipative losses increase as well. Therefore, RF circuits typically use high-Q capacitors to reduce high-frequency losses. Q-factor considerations become even more significant when designing circuits for 5G and mmWave applications.

Further, the self-resonance of a capacitor imposes a frequency limit where a capacitor acts as true capacitive reactance to the circuit. After the resonance point, the impedance rotates, and the capacitor starts to act as an inductive element. Note that in practice, a real capacitor is actually a series RLC (resistor-inductor-capacitor) circuit, and the resonance frequency can be estimated if the leakage resistance, equivalent series resistance, and equivalent series inductance (ESL) are known. Capacitors and inductors have multiple self-resonant frequencies over increasing frequency, which depends on the construction, type, value, and integration method. SRF is thus a significant parameter to consider when designing capacitors for 5G/mmWave applications and it becomes increasingly difficult to develop circuits for 6G and Sub-THz applications due to the self-resonant frequency of the elements.

Typically, the self-resonant frequency of a capacitor fits a downward, generally straight line on a log-log scale when the self-resonant frequency is plotted against capacitance value. As a result, for example, to develop 5G FRI radios operating under 6 GHz, the capacitors need to be designed with SRF way beyond 6 GHz, as capacitor value increases exponentially while approaching its first SRF.

Turning to the technology described herein, example embodiments and implementations are directed towards enhancing the Q-factor of planar capacitors without any impact on the self-resonance frequency. As will be understood, the Q-factor of planar capacitors is improved independent of the SRF by a straightforward design modifications at the device layout level to facilitate fabrication of monolithic MIM capacitors with high capacitance values regardless of material stack change or any heterogeneous integration using vendor components. Having such independent control of the Q-factor change without impacting the SRF provides flexibility in tuning RF components.

Figure 2:
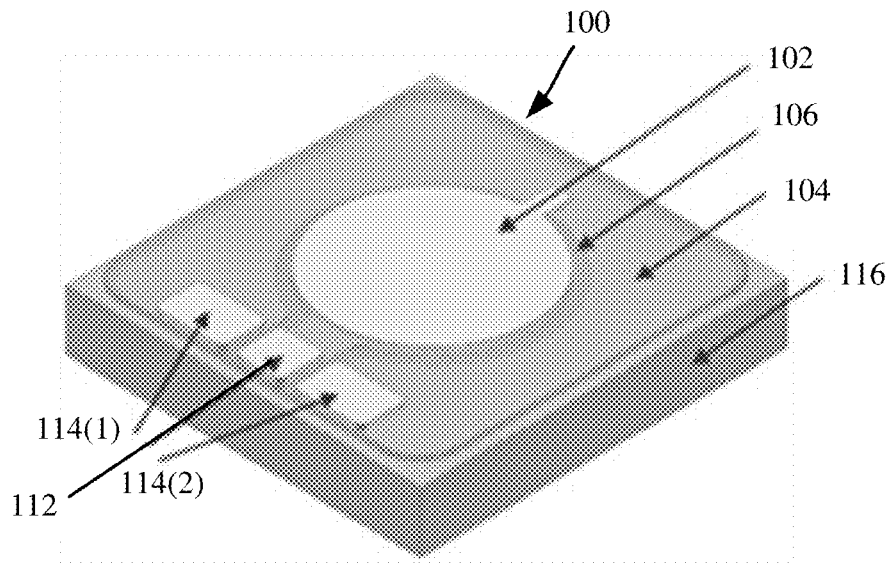
FIG. 2 shows perspective view representations of the example capacitors of FIG. 1, in accordance with various embodiments and implementations of the subject disclosure.
Figure 2:
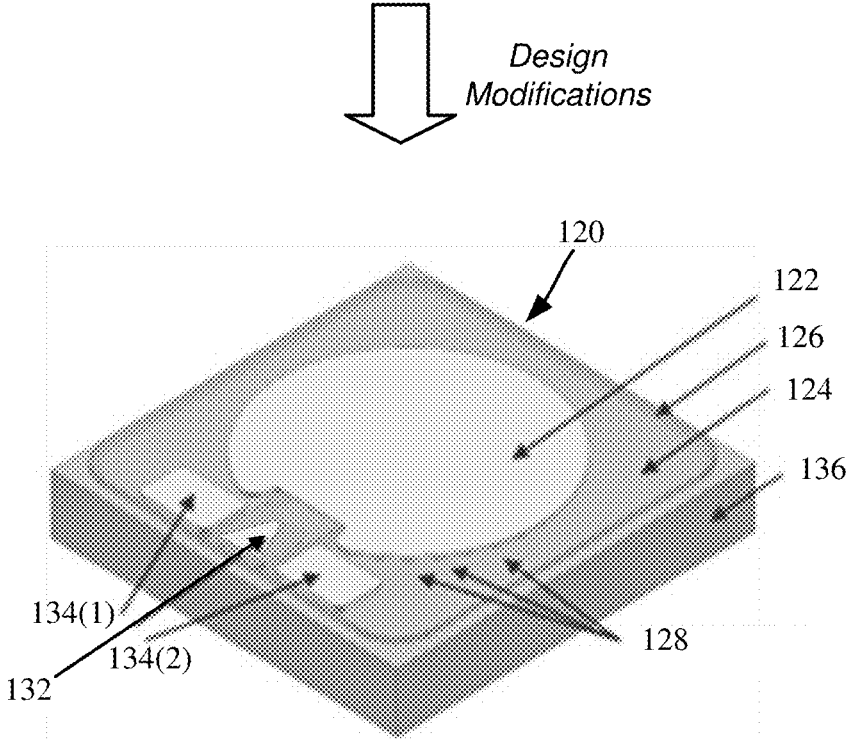

As shown in the upper portions of FIG. 1 (top view) and FIG. 2 (perspective view), a conventional metal-insulator-metal capacitor 100 is constructed by two overlapping conductors 102 and 104 with a dielectric 106 (also referred to as an insulator medium) in between. Various parameters dictate the capacitance value including dielectric thickness, dielectric constant or permittivity and the overlapping area of metal conductors.

A single metal interconnect 108 facilitates a small current flow via between the conductors 102 and 104. Note that the RF ports (collectively 110) include an RF signal port 112 and RF ground port(s) 114(1) and 114(2). For purposes of measurement and device integration, a coplanar waveguide (CPW) port design is utilized in which the RF signal port and RF ground ports are both on the same plane. The coplanar waveguide implementation does not rely on material thickness, which is standard in microstrip implementations.

A substrate 116 is underneath the other components. Note that while a capacitor's self-resonant frequency can be improved by using vertically stacked capacitors, (which is not possible in various PCB or microfabrication processes), the RF also can be improved by removing the substrate underneath the device; in general, however, this makes the device unreliable.

The technology described herein, represented in the lower portion of FIG. 1, is based on design modifications that result in a metal-insulator-metal capacitor 120 that significantly improves the self-resonant frequency and Q-factor (relative to the conventional metal-insulator-metal capacitor 100), including by distributing the interconnects (vias) 128 around the desired overlap area periphery of the two overlapping conductors 122 and 124 with a dielectric 126. This is also shown in the lower portion of FIG. 2 (perspective view) and FIG. 3 (exploded view).

Figure 3:
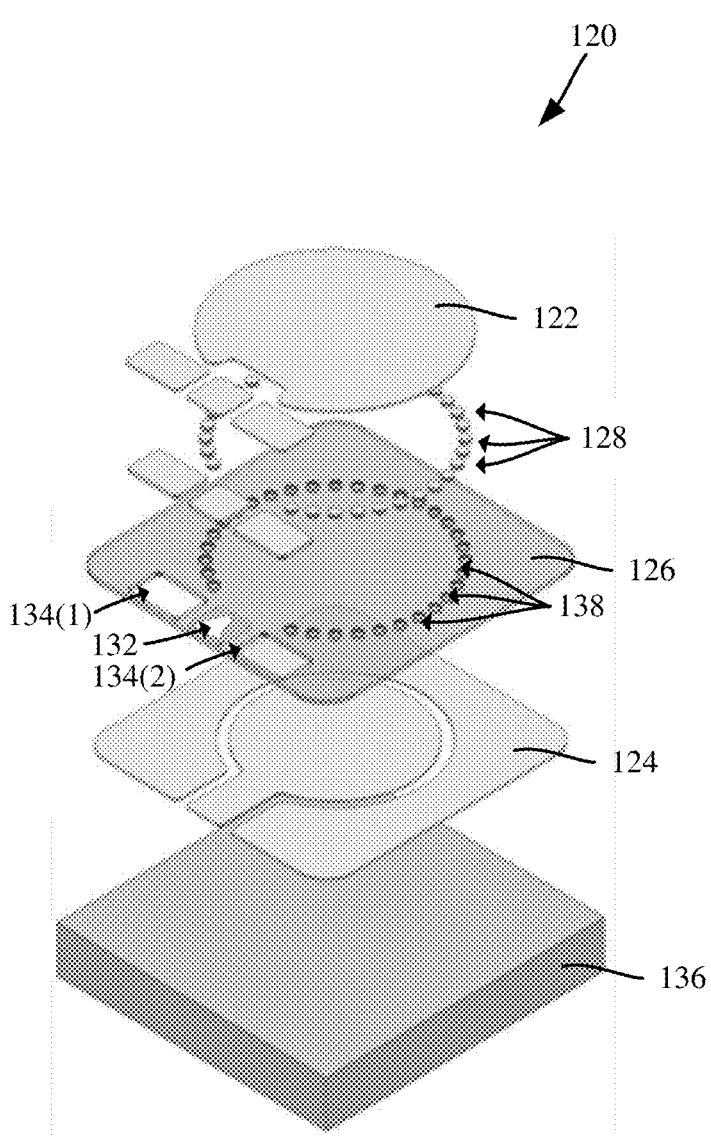
FIG. 3 shows an exploded view of a modified capacitor having a distributed array of conducting interconnects along the device periphery and a tapered RF port section, in accordance with various embodiments and implementations of the subject disclosure.

In the three-dimensional exploded view representation of FIG. 3, the vias 138 through the dielectric medium 126 are shown. In the lower portions of FIGS. 1 and 2, and in FIG. 3, RF ports (collectively 130) include an RF signal port 132 and RF ground port(s) 134(1) and 134(2), and a substrate 136 is similarly underneath the other components. Note that in general, this capacitor design is independent of dielectric thickness, permittivity, and/or overlapping area.

As described herein, another significant design modification is that the RF port 132 sides are angled, shown as symmetrically tapered (resulting in an isosceles trapezoid) in FIGS. 1-3, by "squeezing" the width of the RF port conductor to get narrower in the direction pointing towards the physical interconnect overlapping area. Together these design modifications determine the resonant frequency without affecting the capacitor value, and independently determine the Q-factor simultaneously by changing the series inductance, facilitating bi-directional flexible control of the capacitor performance. Significantly, the design tweaks can be done during layout design, and do not require any change at the manufacturing level, or any addition of new materials/cavities; as such, the technology described herein can easily be adopted by various industries.

It should be noted that the RF port 132 sides need not be symmetrically tapered. For example, only one side of the RF port section may be angled, with the other side remaining straight. As another example, both sides may be angled, with the angle of one side being sharper than the angle of the other side. A side may have multiple angles, or a curved shape. Some examples of angled RF port section alternatives are described with reference to FIGS. 5A, 5B and 6A.

In general, the technology described herein concurrently, yet generally independently, enhances the Q-factor and self-resonance frequency (SRF) of planar capacitors, resulting in augmented flexibility in RF component optimization. In one or more implementations, the technology can be based on only some straightforward layout-level modifications, without, for example, extensive changes to manufacturing processes or the introduction of new materials. By selective alteration of interconnects around the device's periphery, such as by adjusting the desired number/placement of these interconnects, the overall interconnect area facilitates electrical surface current flow between the first conductor and the second conductor, and thereby provide significant improvements in Q-factor and SRF. Further, by modifying the shape of the RF signal port 132, the design principle of the technology described herein is applicable to virtually all MIM capacitors, regardless of their geometry, and can seamlessly transition to multi-layer structures.

As will be understood, straightforward design modifications at the circuit design level facilitate the development of miniaturized high-performance monolithic metal-insulator-metal capacitors with high capacitance values, regardless of material stack change or any heterogeneous integration using vendor components. With this design modification during circuit design, the self-resonant frequency can be pushed far beyond the operational band of interest with simultaneous Q-factor improvement, while not being dependent on choice of materials. The technology described herein is thus based on design modifications, and significantly can be accomplished with no modification required on the fabrication or manufacturing side.

More particularly, one or more implementations of the technology described herein is based on straightforward design modifications, including extending the top conductor electrode 122 to cover a portion of the RF ground plane using the top conductor electrode 122 as shown in FIGS. 1-3. Note that this is in contrast to traditional or standard MIM capacitors, which are designed by overlapping the top conductor electrode only on top of the required capacitive area as generally represented in the top portions of FIGS. 1 and 2. With these design modifications during circuit design, the SRF can be pushed far beyond the operational band of interest with simultaneous Q-factor improvement, and in general are not dependent on choice of materials.

As described herein and further highlighted in FIG. 3, another straightforward design modification is the distribution of the vias 132 between the top conductor layer 122 and bottom conductor layer 124 alongside the periphery of the RF ground plane. As set forth herein, this is in contrast to a traditional or standard MIM capacitor shown that is implemented using only a single interconnect 108 (the upper portion of FIG. 1). Yet another straightforward design modification is the change to the shape of the RF port 132.

Figure 4A:
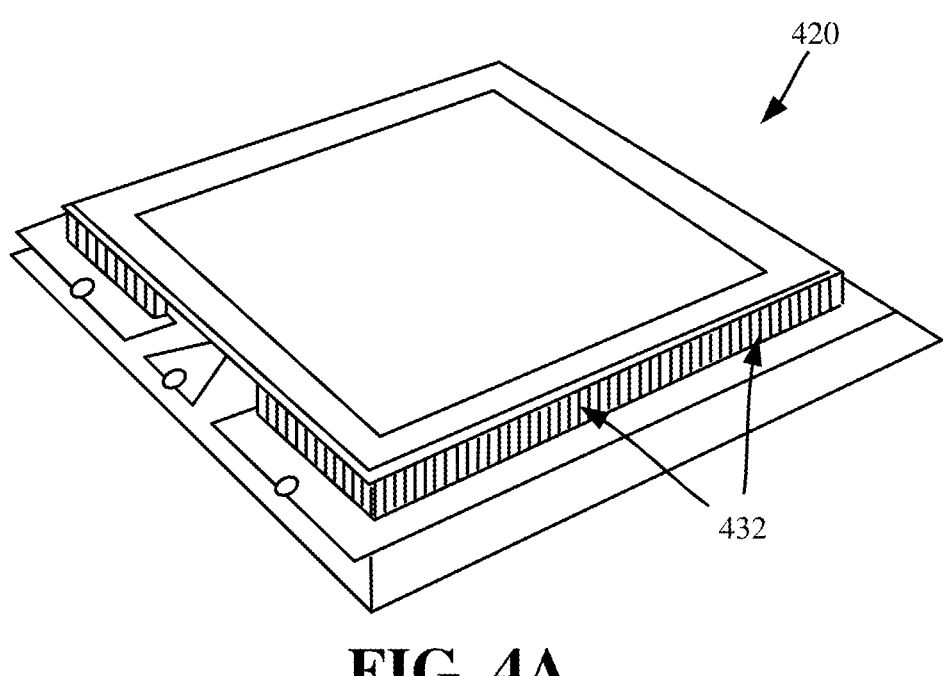
FIG. 4A is a three-dimensional representation of a modified, rectangular capacitor having a distributed array of conducting interconnects along the device periphery and a tapered RF port section, in accordance with various embodiments and implementations of the subject disclosure.
Figure 4B:
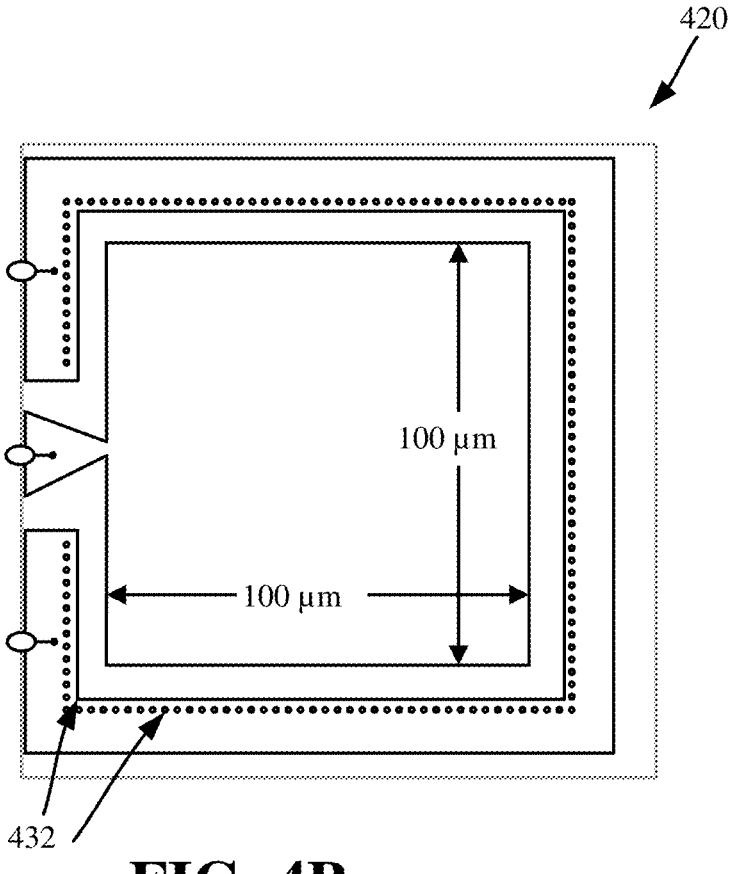
FIG. 4B is a top view model representation of the modified, rectangular capacitor of FIG. 4A having a distributed array of conducting interconnects along the device periphery and a tapered RF port section, in accordance with various embodiments and implementations of the subject disclosure.

As can be readily appreciated, the design modifications can be used with any arbitrary shape of MIM capacitor, not only a circular overlapping area but other shapes, e.g., rectangular. For example, FIGS. 4A and 4B show a perspective view and top view representation of an example rectangular MIM capacitor 440 with any number of interconnects 432. As shown in FIG. 4B, in one implementation the overlapping area can be 100 μm×100 μm, such as with, for example, a 60-nanometer interconnect ring and dielectric.

Material parameters can include 3 μm gold (Au) for the upper and lower conductors, and silicon nitride (SiNx) for the dielectric. Further, the technology described herein can be used on standard two-layer MIM capacitors that include two metal conductor electrodes, as well as in multilayer MIM capacitors, which can potentially include multiple metal conductor layers (e.g., a third conductor and a second insulator) to reduce the overall area of the device.

Figure 5A:
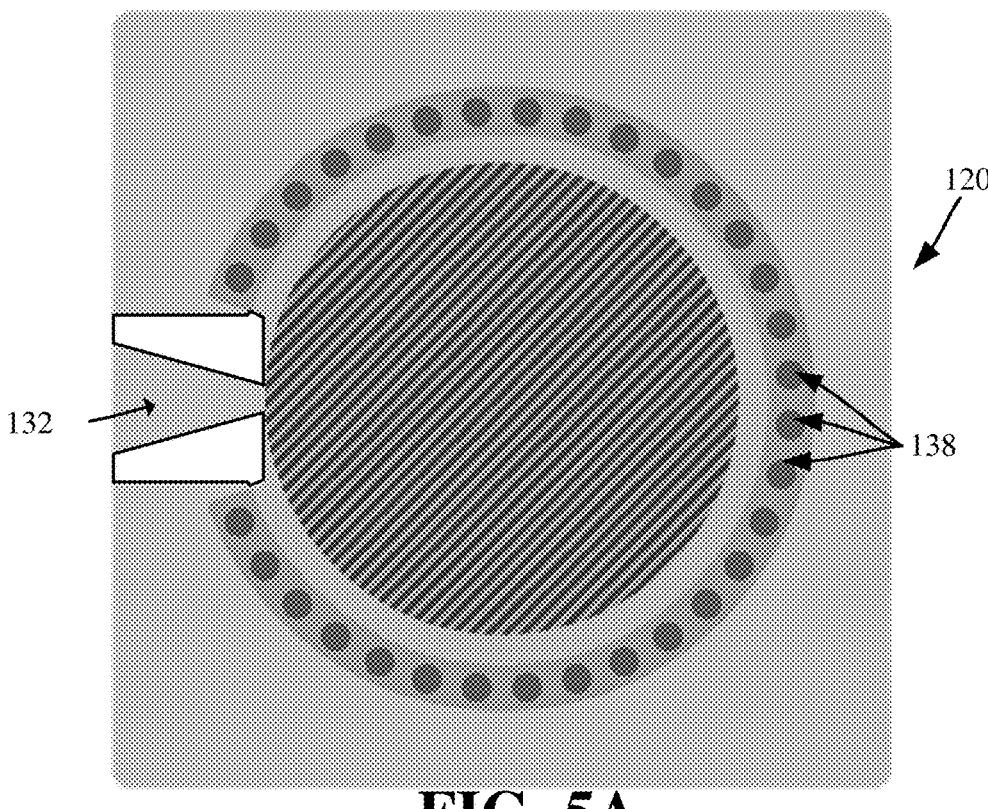
FIG. 5A is top view representation of a modified capacitor having an angled RF port section and an array of conducting interconnects along a large percentage of the device periphery in a general ring shape, in accordance with various embodiments and implementations of the subject disclosure.
Figure 5B:
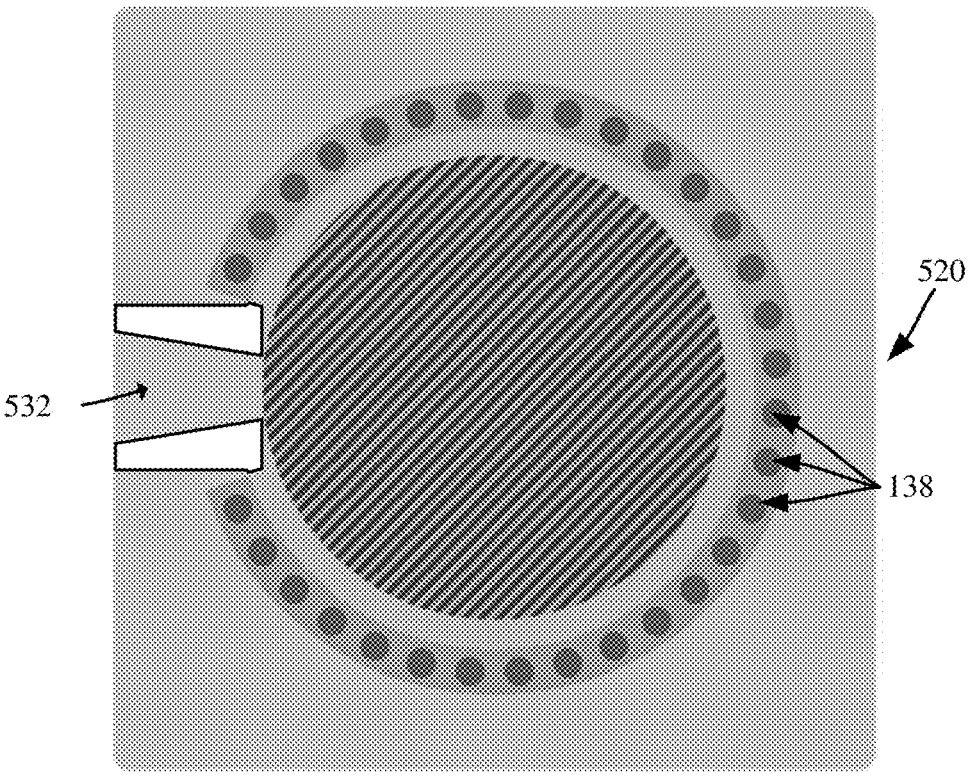
FIG. 5B is top view representation of a modified capacitor having an angled RF port section (wider relative to FIG. 5A) and an array of conducting interconnects along a large percentage of the device periphery in a general ring shape, in accordance with various embodiments and implementations of the subject disclosure.

FIG. 5A is a simplified top view of the example capacitor 120 shown in FIG. 3, with the RF port 132 highlighted by the surrounding unshaded polygons. FIG. 5B is a similar view of a different example capacitor design 520. Note that the angled sides of the RF port 532 in FIG. 5B are angled less than those in the RF port 132 of FIG. 5A, whereby the total area is increased in FIG. 5A compared to FIG. 5B; (the smaller of the trapezoid base lengths are different in FIG. 5A compared to FIG. 5B). The different RF ports 132 and 532 in the capacitors 120 and 520 in FIGS. 5A and 5B, respectively, result in a different parasitic inductance in each capacitor 120 and 520, each of which enhances the Q-factor (relative to capacitors with straight RF ports as in FIG. 6B), yet without impacting the SRF of the device, nor impacting the capacitor value.

Figure 6A:
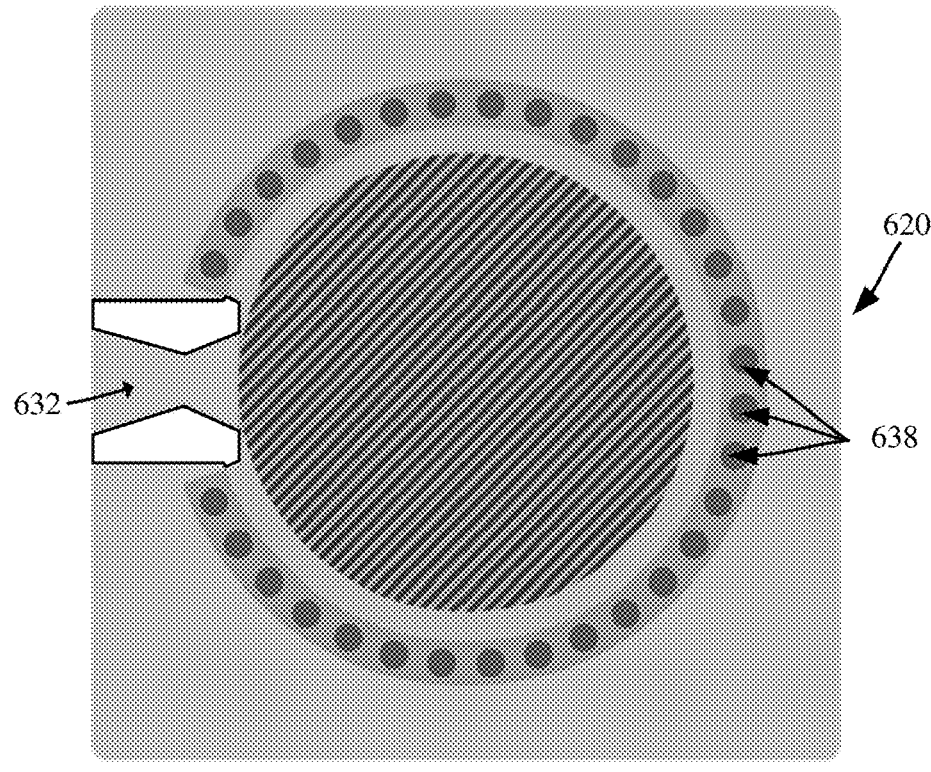
FIG. 6A is top view representation of a modified capacitor having a multiangled RF port section and an array of conducting interconnects along a large percentage of the device periphery in a general ring shape, in accordance with various embodiments and implementations of the subject disclosure.

FIG. 6A shows an example capacitor 620 with another, multiangled RF port design 632. In FIG. 6A, the sides of the RF port 632 narrow in their outer parts, but widen towards their inner parts. This results in yet another a different parasitic inductance, and corresponding different Q-factor.

Figure 6B:
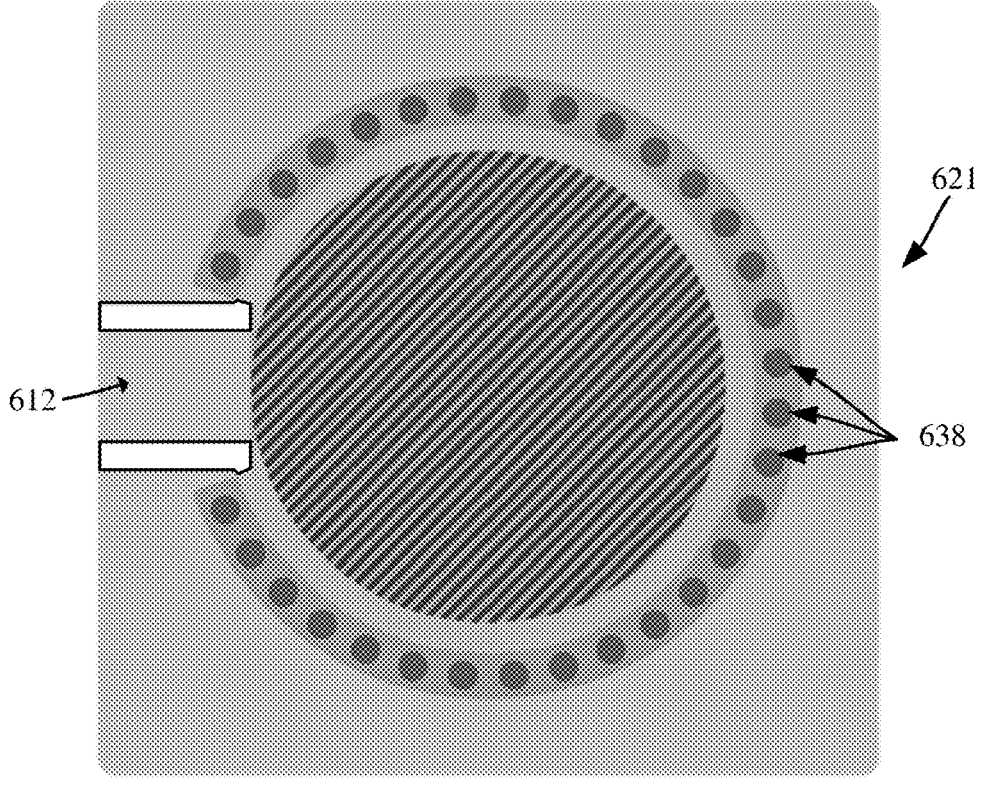
FIG. 6B is top view representation of a modified capacitor having a straight RF port section and an array of conducting interconnects along a large percentage of the device periphery in a general ring shape, in accordance with various embodiments and implementations of the subject disclosure.

FIG. 6B shows an example capacitor 621 with a straight RF port design 612. Note however that unlike the conventional capacitors shown in the upper portions of FIGS. 1 and 2, the example capacitor 621 has interconnects around most of the top metal plane, which provides maximum co-dependent (not independent as in FIG. 3) SRF and Q-factor enhancement.

The difference between the designs of FIGS. 5A, 5B, 6A and 6B is the parasitic inductance change. Electromagnetic simulations prove the design's efficacy, with Q-factor enhancements and SRF shifts clearly demonstrated. To visually demonstrate the differences from each other and traditional capacitors, the upper portions 770 and 880 of FIGS. 7 and 8, respectively, graphically depict the electromagnetic simulation response of a traditional capacitor versus frequency with respect to capacitance and the respective Q-factor, respectively for four different design variations, A-D. These upper portions 770 and 880 of FIGS. 7 and 8 highlight the dependence of the Q-factor on resonance frequency, which effectively change the capacitance value over frequency. In particular, to highlight the effect of resonance frequency change and its connection to the Q-factor, the upper portion 880 of FIG. 8 provides a clear indication of the Q-factor reducing to zero at the self-resonance frequency, and the capacitor value change (FIG. 7), which is expected.

Figure 7:
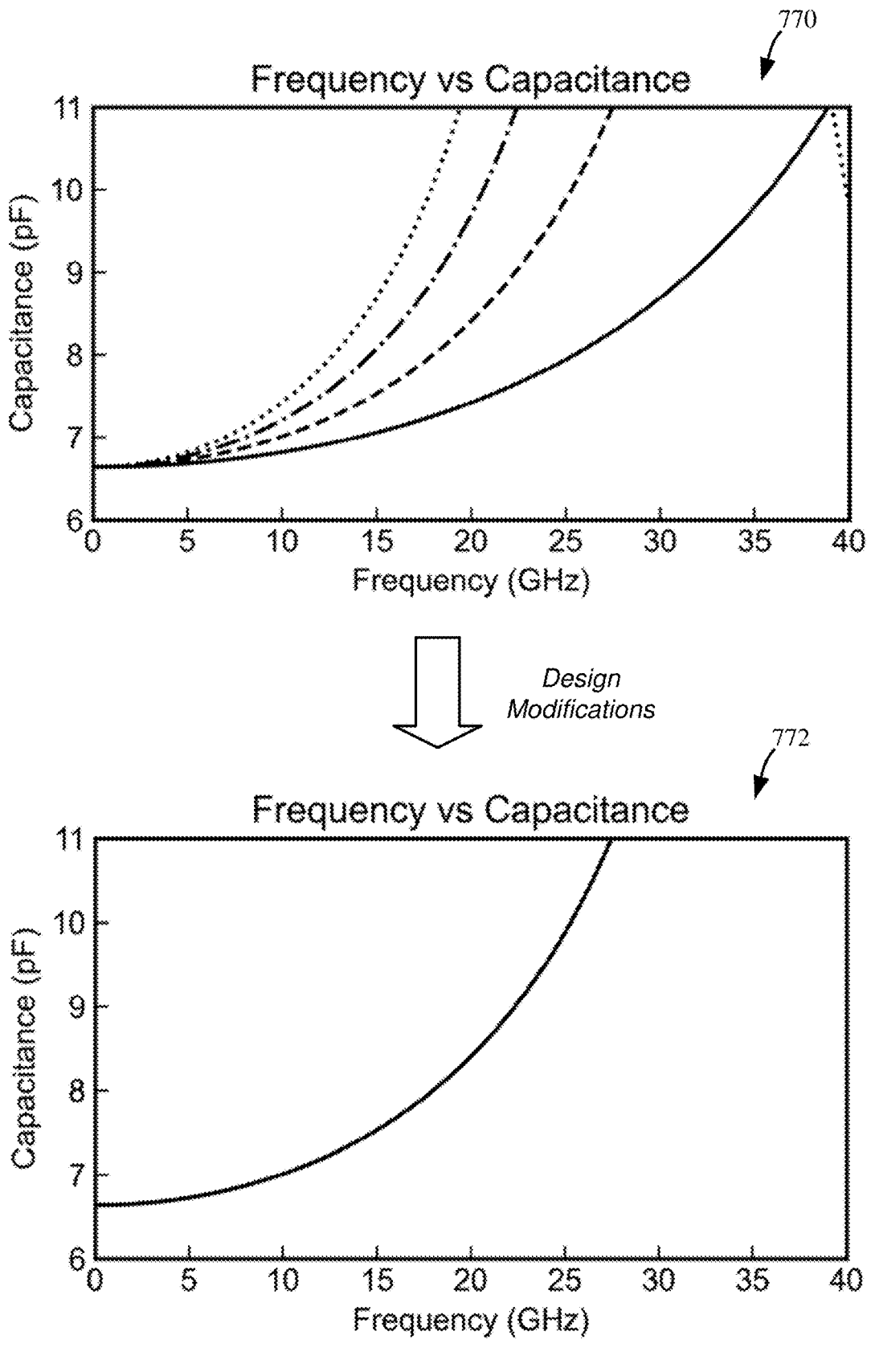
FIG. 7 shows example graph representations of capacitance versus frequency without and with the design changes for the example modified capacitive devices as generally represented in FIGS. 5A, 5B, 6A and 6B, in accordance with various embodiments and implementations of the subject disclosure.
Figure 8:
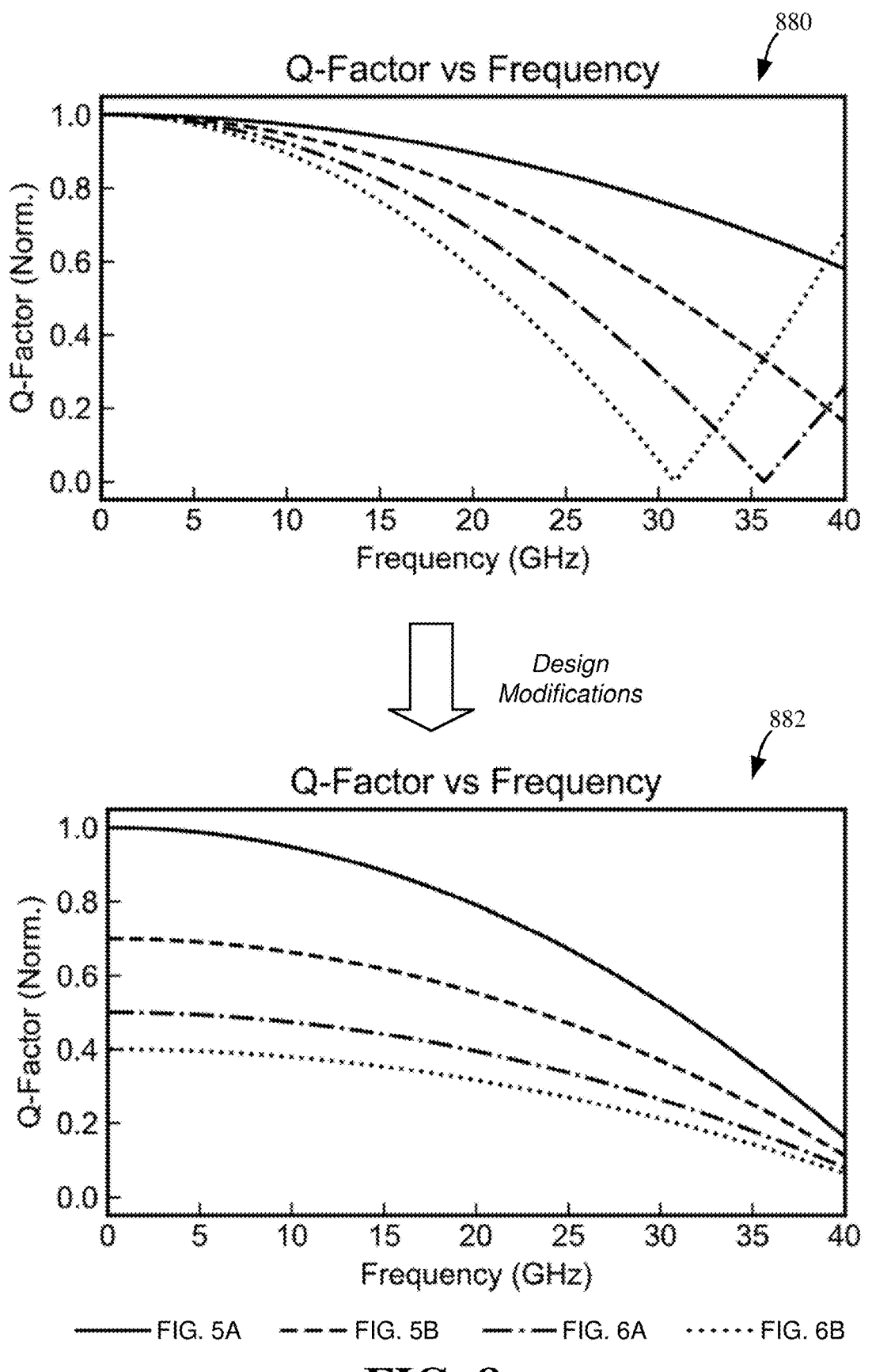
FIG. 8 shows example graph representations of quality factor (Q-factor) versus frequency without and with the design changes for the example modified capacitive devices as generally represented in FIGS. 5A, 5B, 6A and 6B, in accordance with various embodiments and implementations of the subject disclosure.

In contrast, the lower portions 772 and 882, respectively, of FIGS. 7 and 8 graphically depict the electromagnetic simulation response of the capacitor designs of FIGS. 5A, 5B, 6A and 6B versus frequency with respect to capacitance and the respective Q-factor for these different design variations. As can be seen, the changes to the RF port enhance the Q-factor without impacting the SRF of the device, and also does not impact the capacitor value. To reiterate, the design of 6B has a more conventional RF port, yet the SRF and Q-factor are still enhanced relative to traditional capacitor designs.

The lower portions 772 and 882, respectively, of FIGS. 7 and 8 clearly show that for a certain capacitor value, changing the design parameter enhances the Q-factor without affecting the resonance frequency. Indeed, the normalized Q-factor shows more than a sixty percent increase in the Q-factor without any impact on the SRF. All four curves overlap in the capacitor versus frequency plot 772, further validating the negligible impact of the design changes on the SRF, while providing variability and flexibility in Q-factor changes.

By tweaking the RF port section of the devices, a precisely controlled Q-factor can be achieved through the technology described herein. It is worth noting that the angled RF port "squeeze" approach has a limitation on the insertion loss change when the metal width gets too narrow; it depends on the thickness of the metal, as thicker metal provides the opportunity to reduce the width significantly, while for thin metal structures, there needs to be a fine balance between Q-factor and other RF losses/matching.

It should be noted that although a distributed array of interconnects is a straightforward design to implement so as to obtain desirable SRF/Q-factor characteristics, other designs can provide desirable results. For example, a single interconnect that covers a large area with respect to current flow between the conductors can be used; as is understood this area (of such a single interconnect) can be enlarged while shrinking the non-interconnect areas, or reduced while enlarging the non-interconnect areas.

It is also noted that the positions of the interconnect or interconnects can be moved, although centering the interconnects generally opposite the RF ports (centered at 180-degrees) provides desirable results. Also, interconnects need not be symmetrically distributed, and/or there can be gaps between interconnects rather than having them evenly distributed.

Figure 9:
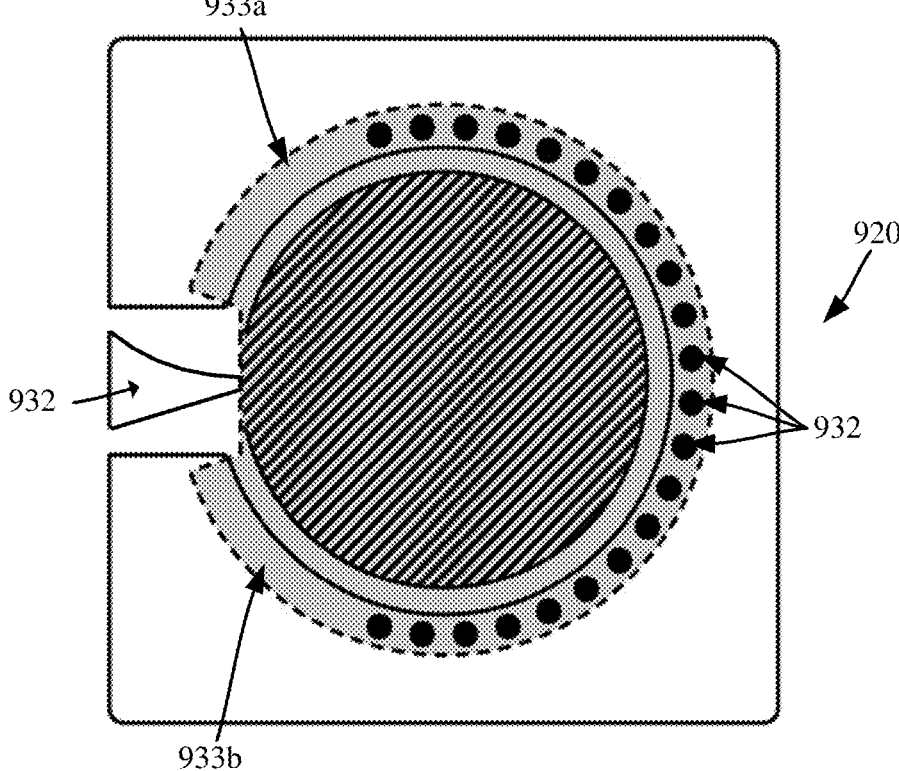
FIG. 9 is top view representation of a modified capacitor having an angled RF port section and an array of conducting interconnects along more than half of the device periphery, in accordance with various embodiments and implementations of the subject disclosure.

By way of an example alternative design, FIG. 9 shows another capacitor design 920 in which the number of interconnects 932 is reduced relative to the number in FIGS. 5A-6B, resulting in less total area (approximately seventy-five percent) for facilitating current flow between the conductors. This is emphasized by the areas 933a and 933b that do not have any interconnects. To illustrate that the RF ports need not be symmetrical or even angled, another example shape of a non-trapezoidal, RF port 932 is depicted in FIG. 9, which is tapered by having one curved side and one angled side. Two symmetrically-curved sides can alternatively be used, as can multiple curves in a side.

Figure 10:
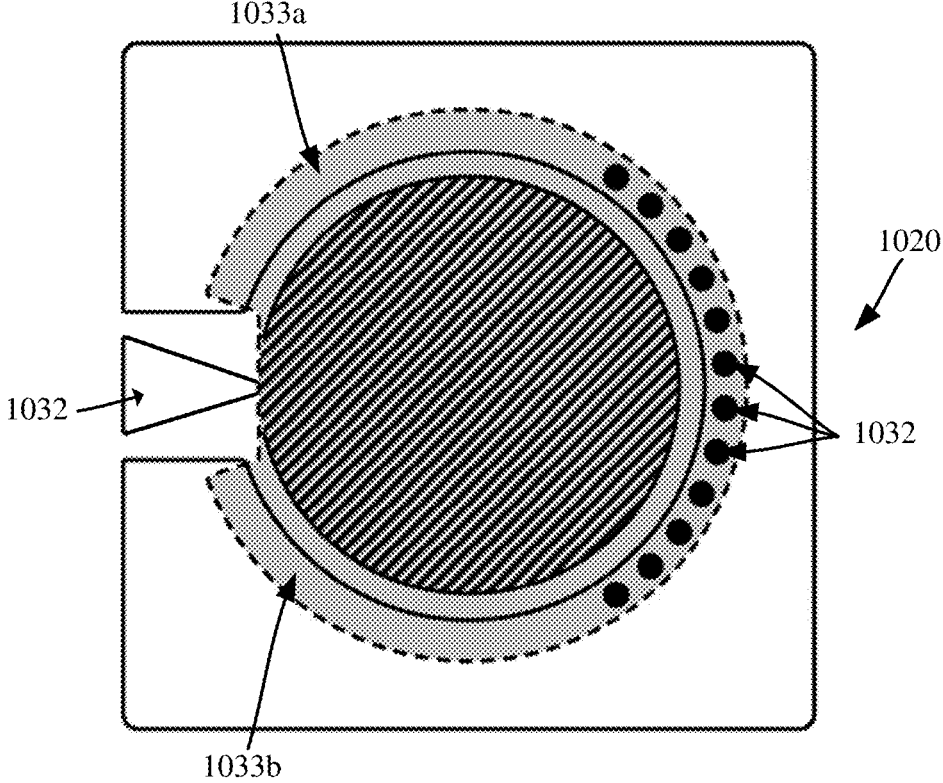
FIG. 10 is top view representation of a modified capacitor having an angled RF port section and an array of conducting interconnects along less than half of the device periphery, in accordance with various embodiments and implementations of the subject disclosure.

FIG. 10 shows another alternative example capacitor design 1020 having interconnects 1032a with still less total interconnect area (approximately forty percent) for facilitating current flow between the conductors. This is emphasized by the larger areas 1033a and 1033b that do not have any interconnects. As is understood, the design in FIG. 10 begins to somewhat approach the traditional design as shown in the upper portions of FIGS. 1 and 2, and as expected, has less SRF improvement, yet has independent Q-factor improvement resulting from the shape of the RF port 1032.

Some non-limiting usage examples of the capacitors based on the technology described herein include impedance matching networks (IMN), or simply impedance tuners, which are needed on user equipment devices (UEs) and base stations. Impedance matching networks utilizing various different technologies are integrated in a wide range of commercial wireless communication devices. Impedance matching networks compensate for the antenna impedance variations that arise within a radio frequency front end due to switching of frequency bands of operation, e.g., when a UE moves between different cellular frequency bands, switching from 4G LTE to 5G network, switching between cellular and Wi-Fi nodes, and the like. Impedance matching networks can also adapt dynamically with variations in output RF power levels, temperature, orientation of the UE, and process deviations as these networks ensure highest system efficiency and optimum power transfer.

Typically, impedance matching networks are developed by having switches integrated with a wide variety of fixed MIM capacitors, or by having some sort of variable capacitance. A large value of stable MIM capacitors, including with high SRF and high Q-factor as described herein, provide a large tuning range such that a single impedance matching network can perform better than integrating multiple impedance matching networks for different tuning ranges.

Thus, impedance matching networks are needed in a wide range of RF equipment; a fundamental element of impedance matching networks are capacitors. High performance MIM capacitors as described herein facilitate developing impedance matching networks that can not only be used in 5G or mm Wave radio equipment, but also in a large variety of consumer electronics such as notebooks, tablets, and other UE devices.

Another usage example for high SRF and high Q-factor capacitors as described herein is in reflective type phase shifters for beamforming. Phase shifters play an important role in the modern phased array systems' performance to provide a wide RF phase tuning range with low transmission loss. Phased arrays are used for beamforming, which is significant in 5G and mmWave communications, because it provides for directional transmission or reception of signals.

While antennas are fixed elements on a printed circuit board or other substrate, their radiation pattern can be tuned by providing an electronic phase shift by including a phase shifter just before the antenna elements. There are various methods to provide phase shift, but effective ones include reflective type phase shifters (RTPS). For monolithically integrated phased array systems for beamforming, reflective type phase shifters provide high phase shift resolution due to their small size and circuit topology. The most common designs of reflective type phase shifters utilize a hybrid coupler with two LC (inductor-capacitor) reflection loads. Hybrid couplers are fixed for a certain frequency band, but the range of phase tuning depends on how much capacitance tuning can be achieved from a reflective load. With a range of capacitance, a small phase shift is achieved, but the range can only be extended by adding a large number of LC sections; however, the phase shift range saturates. A more optimal way to increase the phase shift range is to have higher value capacitors with large SRF as described herein, because a large value of capacitance range reduces the number of sections, which keeps the circuit size small, and allows faster tuning, because a larger number of elements require a large number of switching elements. A single element also provides better reliability.

Capacitors with a SRF below the frequency band of interest should not be used, because the capacitive reactance would behave like an inductance reactance, forfeiting the whole circuit design and can potentially damage the antenna elements. MIM capacitors with high capacitance values having SRF beyond operational frequency band allow developing phase shifters having a large tuning range in a small area. Such phase shifters can be used in 5G infrastructure including but not limited to UE, radio units, 5G intelligent beamforming, mmWave consumer devices such as laptops.

One or more concepts can be embodied in a capacitor device, such as described and represented in the drawing figures herein. The capacitor device can include a first conductor layer, a second conductor layer, and a dielectric layer between the first conductor layer and the second conductor layer. The dielectric layer can be coupled to a physical interconnect overlapping area to facilitate electrical surface current flow between the first conductor layer and the second conductor layer; the physical interconnect overlapping area can be configured to determine a resonance frequency of the capacitor device. The capacitor device further can include a radio frequency port section, which can include an angled conductor configured to couple radio frequency signals to the capacitor device; the angled conductor can determine a quality factor value of the capacitor device that is substantially independent of at least one of: the resonance frequency of the capacitor device, or a capacitance value of the capacitor device.

The angled conductor can include a tapered shape that narrows a width of the angled conductor in a direction pointing towards the physical interconnect overlapping area.

The angled conductor can include a first angled side and a second angled side, the angled conductor can include a tapered shape that narrows a first width of the first angled side in a direction pointing towards the physical interconnect overlapping area, and narrows a second width of the second angled side in the direction pointing towards the physical interconnect overlapping area.

One side of the angled conductor can include a first angled part and a second angled part; the first angled part can narrow a first width of the first angled part for a first length of the first angled part, and the second angled part can widen a second width of the second angled part for a second length of the second angled part.

A first side of the angled conductor can include a first angled part and a second angled part; the first angled part can narrow a first width of the first angled part for a first length of the first angled part, the second angled part can widen a second width of the second angled part for a second length of the second angled part. A second side of the angled conductor can include a third angled part and a fourth angled part; the third angled part can narrow a third width of the third angled part for a third length of the third angled part, and the fourth angled part can widen a fourth width of the fourth angled part for a fourth length of the fourth angled part.

The physical interconnect overlapping area can include a group of respective conducting interconnects as respective vias that determine an overall size of the physical interconnect overlapping area.

The respective conducting interconnects can be distributed in a circular or substantially circular pattern.

The respective conducting interconnects can be distributed proximate to a periphery of the first conductor layer.

The physical interconnect overlapping area can be positioned proximate to a periphery of a radio frequency ground plane of the capacitor device.

The physical interconnect overlapping area can be substantially centered substantially opposite the radio frequency port section.

One or more concepts can be embodied in a device, such as represented herein. The device can include a first conductor electrode separated from a second conductor electrode by a dielectric medium to operate as a metal-insulator-metal capacitor with a radio frequency ground plane, and a physical interconnect overlapping area aligned with a periphery of the radio frequency ground plane to facilitate electrical surface current flow between the first conductor and the second conductor to reduce a surface current density of the metal-insulator-metal capacitor, in which a resonance frequency of the device is based on a size of the physical interconnect overlapping area. The device further can include a radio frequency port section, which can include an angled conductor configured to couple radio frequency signals to the device, in which a shape of the angled conductor determines an enhanced device quality factor relative to a non-angled conductor, and in which the device quality factor is substantially independent of the resonance frequency of the device, and substantially independent of a capacitance value of the device.

The angled conductor can include at least one angled side that narrows a width of the angled conductor in a direction pointing towards the physical interconnect overlapping area.

The angled conductor can include at least one multiangled side that varies a width of the angled conductor in a direction pointing towards the physical interconnect overlapping area.

The physical interconnect overlapping area can include a geometrically distributed array of interconnects that enables electrical vias from the first conductor electrode to the second conductor electrode through the dielectric medium.

The dielectric medium can be a first dielectric medium, and the device further can include a third conductor electrode separated from the second conductor electrode by a second dielectric medium.

One or more concepts can be embodied in a capacitor, such as described and represented herein. The capacitor can include a first conductor overlapping with a dielectric layer; the dielectric layer can overlap with a second conductor that is coupled to a substrate. The first conductor can be electrically coupled to the second conductor via an array of interconnects through the dielectric layer, in which the array of interconnects facilitates electrical surface current flow between the first conductor and the second conductor, and determines a self-resonant frequency of the capacitor. A radio frequency port section of the capacitor can include a tapered conductor, at least in part, configured to couple radio frequency signals to the capacitor, in which the tapered conductor determines a quality factor value of the capacitor that is substantially independent of the self-resonant frequency of the capacitor.

The tapered conductor can include at least one angled or curved side that narrows a width of the angled conductor in a direction pointing towards a center of the capacitor.

The array of interconnects can include a geometrically distributed array positioned proximate to a periphery of the first conductor.

The capacitor can be deployed as a tuning element as part of an impedance matching network.

The capacitor can be a part of a millimeter-wave frequency phase shifter for antenna elements.

As can be seen, there is provided a capacitor technology for capacitors with high self-resonant frequency and enhanced Q-factor for use in high frequency (e.g., RF) applications. Advantages compared to other known solutions include more stable capacitance at higher (e.g., mmWave) frequencies. Further, the technology can be implemented with straightforward design modifications, e.g., design tweaks at the device layout level, to improve the SRF and/or Q-factor of planar capacitors, independent of each other and independent of the capacitor value; that is, the technology described herein can desirably and independently enhance the self-resonance frequency and Q-factor of planar capacitors without affecting each other or the capacitor's intrinsic value.

As set forth herein, the design modifications can be used for any arbitrary shape of MIM capacitor and not just limited to a circular overlapping area. The technology is based on slight design modifications, with no modification required on fabrication or manufacturing side. This technique can be used on standard two-layer MIM capacitors that include M1 and M2, or multilayer MIM capacitors which can potentially include multiple metal conductor layers to reduce the overall area of the device.

The technology described herein thus can be seamlessly integrated during the layout phase, obviating the need for manufacturing modifications. This allows industries to develop and manufacture miniaturized high performance monolithic MIM capacitors with high capacitance values independent of material stack changes or any heterogeneous integration using vendor components. Having independent control of Q-factor and SRF change without impacting the capacitor value provides flexibility in tuning RF components, and thus extends the usable range of the component towards high frequencies, without any additional material inclusions, providing applicability into the mmWave spectrum.

What is described above includes mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A capacitor device, comprising:
   a first conductor layer;
   a second conductor layer;
   a dielectric layer between the first conductor layer and the second conductor layer, the dielectric layer coupled to a physical interconnect overlapping area to facilitate electrical surface current flow between the first conductor layer and the second conductor layer, wherein the physical interconnect overlapping area is configured to determine a resonance frequency of the capacitor device; and
   a radio frequency port section comprising an angled conductor configured to couple radio frequency signals to the capacitor device, wherein the angled conductor determines a quality factor value of the capacitor device that is substantially independent of at least one of:
   the resonance frequency of the capacitor device, or
   a capacitance value of the capacitor device, wherein the physical interconnect overlapping area is substantially centered substantially opposite the radio frequency port section.

2. The capacitor device of claim 1, wherein the angled conductor comprises a tapered shape that narrows a width of the angled conductor in a direction pointing towards the physical interconnect overlapping area.

3. The capacitor device of claim 1, wherein the angled conductor comprises a first angled side and a second angled side, the angled conductor comprising a tapered shape that narrows a first width of the first angled side in a direction pointing towards the physical interconnect overlapping area, and narrows a second width of the second angled side in the direction pointing towards the physical interconnect overlapping area.

4. The capacitor device of claim 1, wherein one side of the angled conductor comprises a first angled part and a second angled part, wherein the first angled part narrows a first width of the first angled part for a first length of the first angled part, and wherein the second angled part widens a second width of the second angled part for a second length of the second angled part.

5. The capacitor device of claim 1, wherein a first side of the angled conductor comprises a first angled part and a second angled part, wherein the first angled part narrows a first width of the first angled part for a first length of the first angled part, wherein the second angled part widens a second width of the second angled part for a second length of the second angled part, wherein a second side of the angled conductor comprises a third angled part and a fourth angled part, wherein the third angled part narrows a third width of the third angled part for a third length of the third angled part, and wherein the fourth angled part widens a fourth width of the fourth angled part for a fourth length of the fourth angled part.

6. The capacitor device of claim 1, wherein the physical interconnect overlapping area comprises a group of respective conducting interconnects as respective vias that determine an overall size of the physical interconnect overlapping area.

7. The capacitor device of claim 6, wherein the respective conducting interconnects are distributed in a circular or substantially circular pattern.

8. The capacitor device of claim 6, wherein the respective conducting interconnects are distributed proximate to a periphery of the first conductor layer.

9. The capacitor device of claim 1, wherein the physical interconnect overlapping area is positioned proximate to a periphery of a radio frequency ground plane of the capacitor device.

10. A device, comprising:
a first conductor electrode separated from a second conductor electrode by a dielectric medium to operate as a metal-insulator-metal capacitor with a radio frequency ground plane;
a physical interconnect overlapping area aligned with a periphery of the radio frequency ground plane to facilitate electrical surface current flow between the first conductor and the second conductor to reduce a surface current density of the metal-insulator-metal capacitor, wherein a resonance frequency of the device is based on a size of the physical interconnect overlapping area; and
a radio frequency port section comprising an angled conductor configured to couple radio frequency signals to the device, wherein a shape of the angled conductor determines an enhanced device quality factor relative to a non-angled conductor, and wherein the device quality factor is substantially independent of at least one of:

the resonance frequency of the device, or
a capacitance value of the device, wherein the physical interconnect overlapping area is substantially centered substantially opposite the radio frequency port section.

11. The device of claim 10, wherein the angled conductor comprises at least one angled side that narrows a width of the angled conductor in a direction pointing towards the physical interconnect overlapping area.

12. The device of claim 10, wherein the angled conductor comprises at least one multiangled side that varies a width of the angled conductor in a direction pointing towards the physical interconnect overlapping area.

13. The device of claim 10, wherein the physical interconnect overlapping area comprises a geometrically distributed array of interconnects that enables electrical vias from the first conductor electrode to the second conductor electrode through the dielectric medium.

14. The device of claim 10, wherein the dielectric medium is a first dielectric medium, and further comprising a third conductor electrode separated from the second conductor electrode by a second dielectric medium.

15. The device of claim 10, wherein the physical interconnect overlapping area comprises a group of respective conducting interconnects as respective vias that determine an overall size of the physical interconnect overlapping area, and wherein the respective conducting interconnects are distributed in a circular or substantially circular pattern.

16. A capacitor, comprising:
a first conductor overlapping with a dielectric layer coupled to a physical interconnect overlapping area overlapping with a second conductor that is coupled to a substrate, the first conductor electrically coupled to the second conductor via an array of interconnects through the dielectric layer comprised in the physical interconnect overlapping area, wherein the array of interconnects facilitates electrical surface current flow between the first conductor and the second conductor, and determines a self-resonant frequency of the capacitor; and
a radio frequency port section comprising a tapered conductor configured to couple radio frequency signals to the capacitor, wherein the tapered conductor determines a quality factor value of the capacitor that is substantially independent of at least one of:
the self-resonant frequency of the capacitor, or
a capacitance value of the device, wherein the physical interconnect overlapping area is substantially centered substantially opposite the radio frequency port section.

17. The capacitor of claim 16, wherein the angled conductor comprises at least one angled or curved side that narrows a width of the angled conductor in a direction pointing towards a center of the capacitor.

18. The capacitor of claim 16, wherein the array of interconnects comprises a geometrically distributed array positioned proximate to a periphery of the first conductor.

19. The capacitor of claim 16, wherein the capacitor is deployed as a tuning element as part of an impedance matching network.

20. The capacitor of claim 16, wherein the capacitor is a part of a millimeter-wave frequency phase shifter for antenna elements.

* * * * *